(12) United States Patent
Shamine

(10) Patent No.: US 7,296,474 B2
(45) Date of Patent: Nov. 20, 2007

(54) FLUID SENSOR HAVING A LOW PRESSURE DRAIN

(75) Inventor: David Michael Shamine, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 125 days.

(21) Appl. No.: 10/975,416

(22) Filed: Oct. 29, 2004

(65) Prior Publication Data

US 2006/0090567 A1    May 4, 2006

(51) Int. Cl.
*G01L 7/10* (2006.01)

(52) U.S. Cl. ............... 73/729.2; 73/40; 73/700; 73/756

(58) Field of Classification Search .......... 73/700–756, 73/40–40.7; 137/312–314; 361/283.1–283.4
See application file for complete search history.

(56) References Cited

U.S. PATENT DOCUMENTS

| | | | |
|---|---|---|---|
| 4,013,105 A | 3/1977 | Uuskallio | |
| 4,187,817 A * | 2/1980 | Wilson et al. | ............... 123/463 |
| 4,877,155 A | 10/1989 | Tull | |
| 4,913,813 A | 4/1990 | Covarrubias et al. | |
| 4,929,356 A | 5/1990 | Todd | |
| 5,228,350 A * | 7/1993 | Karpf et al. | ............. 73/864.81 |
| 5,259,185 A | 11/1993 | Peterson | |
| 5,267,468 A * | 12/1993 | Zoccoletti et al. | ............. 73/40 |
| 5,638,781 A | 6/1997 | Sturman | |
| 5,836,356 A * | 11/1998 | Desai | ........................ 138/44 |
| 5,869,766 A * | 2/1999 | Cucci et al. | .................. 73/706 |
| 6,070,883 A | 6/2000 | Marto | |
| 6,289,722 B1 * | 9/2001 | Lycan et al. | ................. 73/49.2 |
| 6,345,609 B1 | 2/2002 | Djordjevic | |
| 6,422,209 B1 * | 7/2002 | Mattes | ....................... 123/467 |
| 6,751,858 B2 | 6/2004 | Tokuhara et al. | |
| 6,886,398 B2 * | 5/2005 | Tsuyuki et al. | ............ 73/118.1 |

* cited by examiner

*Primary Examiner*—Edward Lefkowitz
*Assistant Examiner*—Jermaine Jenkins
(74) *Attorney, Agent, or Firm*—Finnegan, Henderson, Farabow, Garrett & Dunner

(57) ABSTRACT

A sensor is provided for a fluid system having a tank and a source of pressurized fluid. The sensor has a sensor body enclosing a sensor element that is configured to sense a parameter of the pressurized fluid. The sensor also has a first passageway configured to fluidly communicate the sensor element with the pressurized fluid and a first sealing interface configured to seal the first passageway. The sensor further has a second passageway configured to allow fluid that has leaked past the first sealing interface to drain to the tank.

36 Claims, 4 Drawing Sheets

FLUID SENSOR HAVING A LOW PRESSURE DRAIN

TECHNICAL FIELD

The present disclosure is directed to a fluid sensor and, more particularly, to a fluid sensor having a low pressure drain.

BACKGROUND

Fuel systems often include a source of pressurized fuel, one or more fuel injectors, and a distribution system for directing the pressurized fuel from the source to the fuel injectors. The fuel injectors are often associated with an engine and it can be important to monitor various parameters of the pressurized fuel such as, for example, a temperature, a viscosity, a pressure, and other parameters known in the art to facilitate proper operational control of the engine. One or more sensors can be employed to monitor these parameters and may require direct contact with the pressurized fuel. These sensors typically include a seal to minimize leakage caused by an interface between the sensors and the fuel system.

One such sensor-seal arrangement is described in U.S. Pat. No. 6,070,883 (the '883 patent) to Marto, issued on Jun. 6, 2000. The '883 patent describes a sealing unit for a fuel pressure sensor for sealing a flat sealing joint between the sensor and a fluid pressure carrying component. The sealing unit includes a round sealing washer with a central bore, the sealing washer being disposed between a threaded bolt-shaped end of the sensor and a bottom of a threaded bore of the fluid pressure carrying component.

Although the sealing unit of the '883 patent may reduce fuel leakage caused by the interface between the fuel pressure sensor and the fluid pressure carrying component, the sealing unit of the '883 patent does not contain the fluid that does leak past the interface. In particular, when fuel does leak past the sealing unit of the '883 unit, it will be allowed to escape to the surrounding environment.

The disclosed fuel system is directed to overcoming one or more of the problems set forth above.

SUMMARY OF THE INVENTION

One aspect of the present disclosure is directed to a sensor for a fluid system having a tank and a source of pressurized fluid. The sensor includes a sensor body enclosing a sensor element that is configured to sense a parameter of the pressurized fluid. The sensor also includes a first passageway configured to fluidly communicate the sensor element with the pressurized fluid and a first sealing interface configured to seal the first passageway. The sensor further includes a second passageway configured to allow fluid that has leaked past the first sealing interface to drain to the tank.

Another aspect of the present disclosure is directed to a method of sensing a parameter of a fluid system. The method includes directing pressurized fluid from the fluid system to a sensor having a sensing element via a first fluid passageway. The sensing element is sealed to the fluid system via a first sealing interface. The method also includes sensing a parameter of the pressurized fluid. The method further includes directing fluid that has leaked past the first sealing interface to a tank via a second fluid passageway.

DETAILED DESCRIPTION

Figure 1:
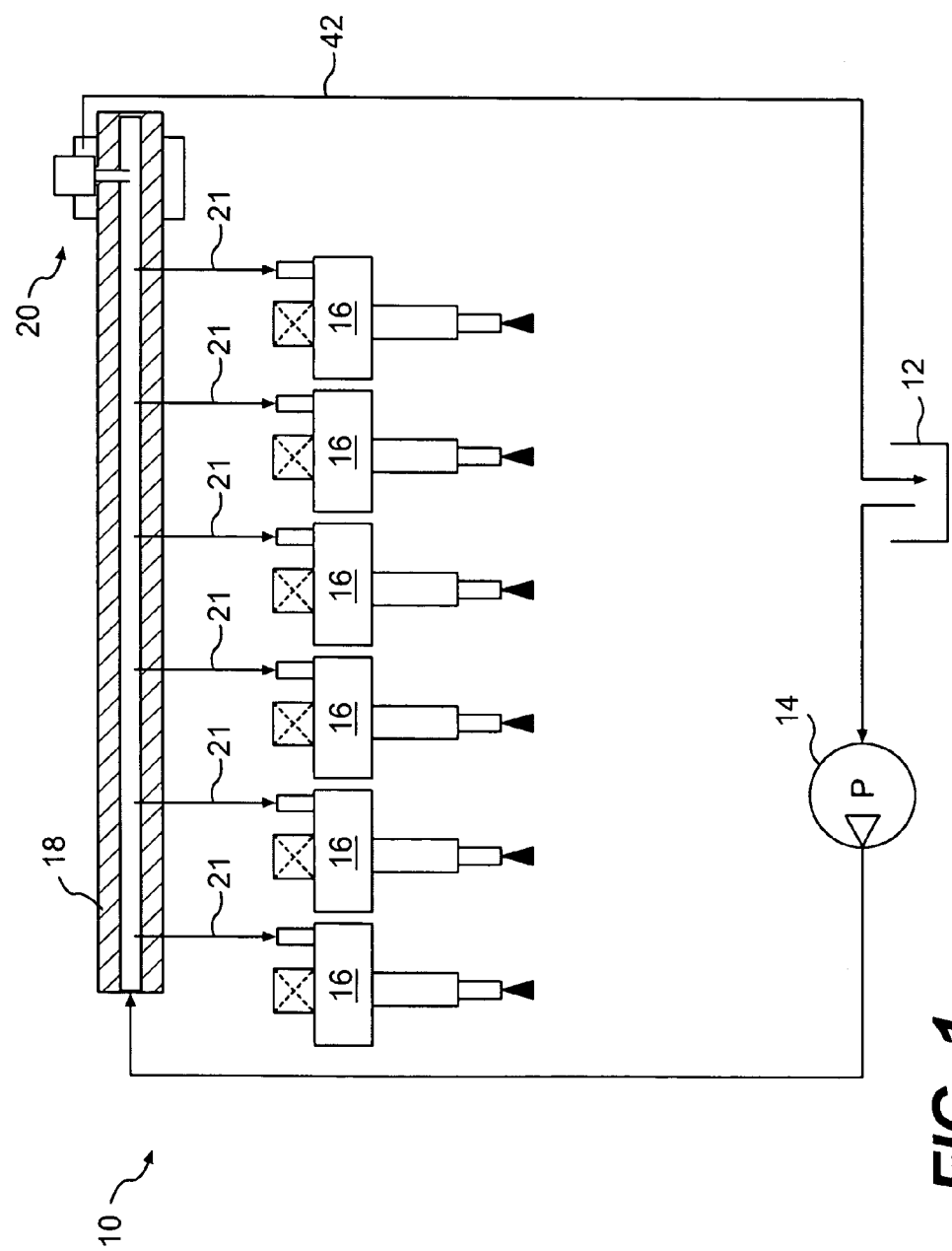
FIG. 1 is a schematic illustration of an exemplary disclosed fluid system.

FIG. 1 illustrates an exemplary fluid system 10. Fluid system 10 may be operably connected to a power source (not shown) and may include a source 14 adapted to draw fluid from a supply tank 12, to pressurize the fluid, and to direct the pressurized fluid to one or more fluid actuators. For example, fluid system 10 may include a fuel injection system connecting source 14 to a plurality of fuel injectors 16 by way of a common rail 18. Fluid system 10 may direct fuel, hydraulic oil, or any other fluid known in the art to fuel injectors 16 either for direct injection or to cause actuation of fuel injectors 16. During operation of fluid system 10, various parameters of the fluid within common rail 18 may be monitored via a sensor 20. It is contemplated that fluid system 10 may alternately be a hydraulic system other than a fuel injection system such as, for example, a hydraulic actuator system configured to move a cylinder associated with a work implement, a hydraulic transmission system, an engine lubrication sytem, or any other hydraulic system known in the art.

Supply tank 12 may constitute a reservoir configured to hold a supply of fluid. The fluid may include, for example, a liquid or gaseous fuel, a dedicated hydraulic oil, an engine lubrication oil, a transmission lubrication oil, or any other fluid known in the art. One or more hydraulic systems associated with the power source may draw fluid from and return fluid to supply tank 12. It is also contemplated that fluid system 10 may be connected to multiple separate fluid supply tanks.

Source 14 may be configured to produce a flow of pressurized fluid and may include a pump such as, for example, a variable displacement pump, a fixed displacement pump, a variable flow pump, or any other source of pressurized fluid known in the art. Source 14 may be drivably connected to the power source (not shown) by, for example, a countershaft (not shown), a belt (not shown), an electrical circuit (not shown), or in any other suitable manner. Source 14 may be dedicated to supplying pressurized fluid only to fluid system 10, or may alternately supply pressurized fluid to multiple hydraulic systems.

Each of fuel injectors 16 may be disposed within a cylinder head (not shown) associated with combustion chambers (not shown) of the power source. Each fuel injector 16 may be operable to inject an amount of pressurized fuel into the combustion chamber at predetermined fuel pressures and fuel flow rates. Each fuel injector 16 may be mechanically, electrically, pneumatically, or hydraulically operated.

Common rail 18 may be a hollow tubular member configured to distribute the flow of pressurized fluid from source 14. In particular, common rail 18 may connect source 14 to fuel injectors 16 by way of a plurality of fuel lines 21. In this manner, source 14 may draw fuel from supply tank 12 and direct the fuel to each fuel injector 16.

Figure 2:
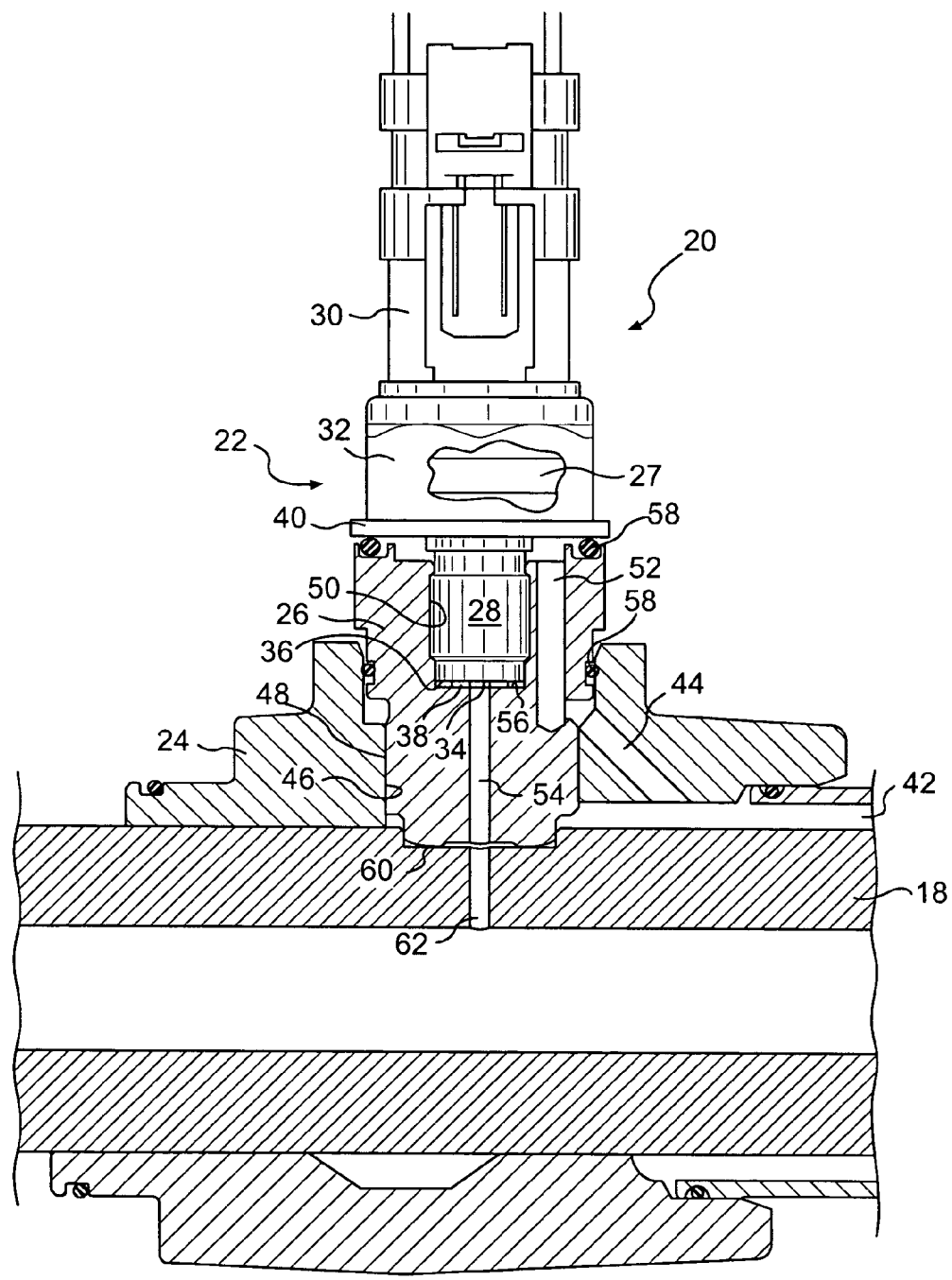
FIG. 2 is a partial cross-sectional illustration of an exemplary disclosed fluid sensor of the fuel system depicted in FIG. 1.

As illustrated in FIG. 2, sensor 20 may include an assembly of components that cooperate to sense one or more parameters of the fluid within fluid system 10. Specifically, sensor 20 may include a sensor body 22, a coupling member 24, and an intermediate member 26. Sensor 20 may sense a pressure, a temperature, a viscosity, a flow rate, a contamination level, or any other suitable fluid parameter.

Sensor body 22 may house a sensing element 27 and include a protrusion 28 having external threads, an electrical connector 30, and tool engagement surfaces 32. Protrusion 28 of sensor body 22 may provide a means for connecting sensor body 22 to intermediate member 26, a fluid passageway allowing fluid from common rail 18 to communicate with sensing element 27, and a means for sealing the fluid passageway. In particular, a central bore 34 within protrusion 28 may form the fluid passageway, while a flat end surface 36 of protrusion 28 may provide a bearing surface against which a sealing washer 38 may be compressed. It is contemplated that sealing washer 38 may be absent, if desired, with a deformable bite edge being alternately included. Electrical connector 30 may provide a means for conducting signals from sensor 20. Tool engagement surfaces 32 may provide a means for assembling sensor 20 to fluid system 10. A substantially planar flanged member 40 may be disposed between protrusion 28 and tool engagement surfaces 32.

Coupling member 24 may be connected to common rail 18 and may provide a low-pressure leak path to supply tank 12. In particular, coupling member 24 may be a generally hollow cylindrical member disposed radially around a portion of common rail 18. A space may be provided between coupling member 24 and common rail 18 such that a low-pressure drain passageway 42 in fluid communication with the space may allow fluid buildup within the space to drain to supply tank 12. Coupling member 24 may also include a low-pressure radial passageway 44 fluidly connecting intermediate member 26 with the space between coupling member 24 and common rail 18. Coupling member 24 may further include internal threads 46 configured to receive intermediate member 26.

Intermediate member 26 may be disposed between sensor body 22 and coupling member 24 and may include multiple fluid passageways and sealing interfaces. In particular, intermediate member 26 may include external threads 48 configured to engage internal threads 46 of coupling member 24 and internal threads 50 configured to receive externally-threaded protrusion 28 of sensor body 22. Intermediate member 26 may include a first fluid passageway 54 and a second fluid passageway 52. First fluid passageway 54 may fluidly connect common rail 18 to central bore 34 of sensor body 22. Second fluid passageway 52 may provide a leak path for fluid that escapes past sealing washer 38 to low-pressure drain passageways 42, 44. Intermediate member 26 may also have a substantially planar bearing surface 56 in opposition to flat end surface 36 of protrusion 28 such that sealing washer 38 may be compressibley sandwiched between the two surfaces. One or more sealing members 58 such as, for example, o-rings, may be disposed between intermediate member 26 and a peripheral edge of planar flanged member 40, and between intermediate member 26 and coupling member 24.

The threading of intermediate member 26 into coupling member 24 may provide a sealing interface between intermediate member 26 and common rail 18. In particular, intermediate member 26 may include a bite edge 60 that deforms against common rail 18 as intermediate member 26 is threaded into coupling member 24 such that common rail 18 may be clamped between the deforming bite edge 60 of intermediate member 26 and lower internal support surfaces of coupling member 24, as intermediate member 26 is threaded into coupling member 24. In this manner, sensor 20 may be held in place relative to common rail 18 and sealed to common rail 18. A radial passageway 62 within common rail 18 may allow fluid communication between common rail 18 and first fluid passageway 54.

Figure 3:
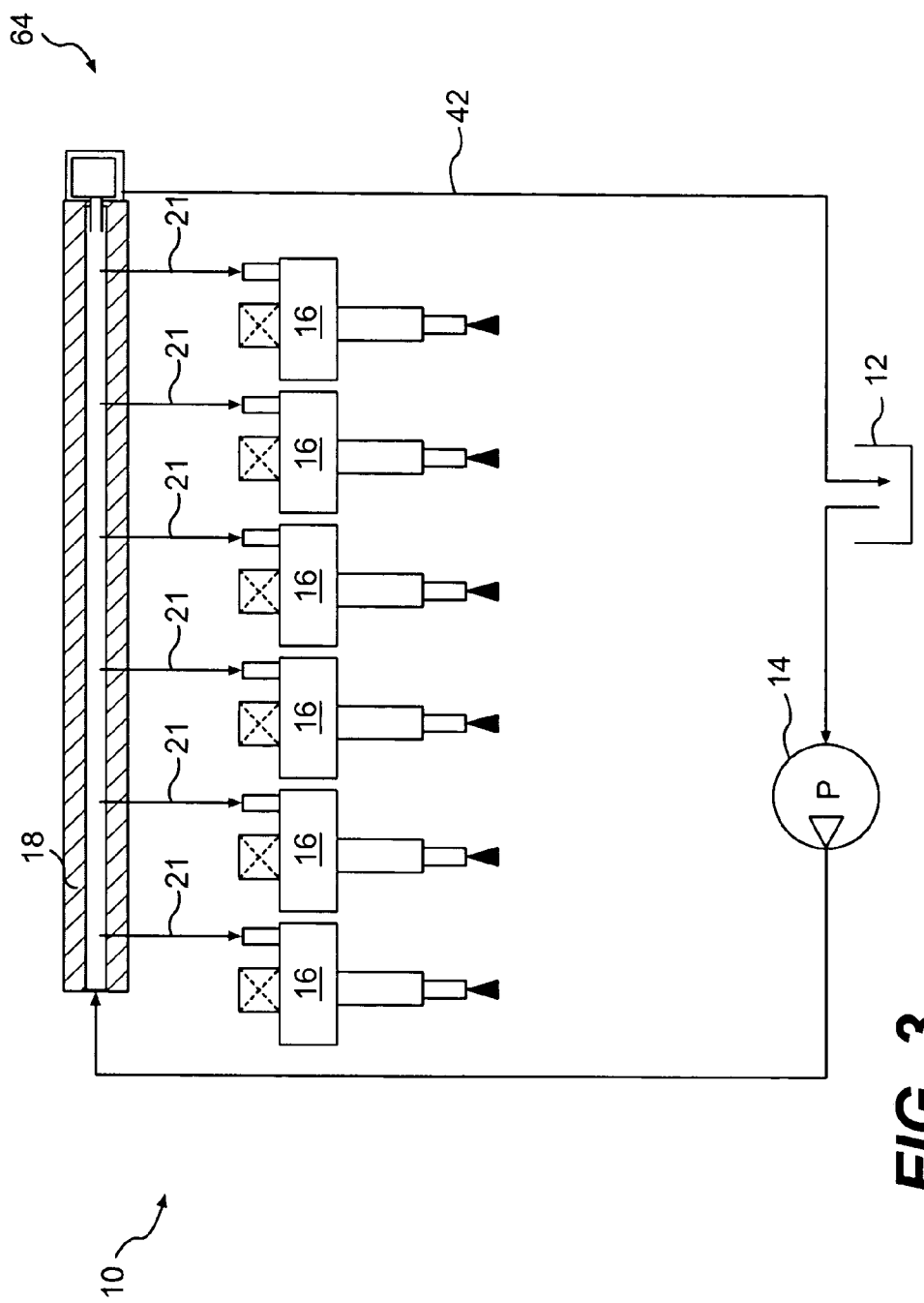
FIG. 3 is a schematic illustration of another exemplary disclosed fluid system.
Figure 4:
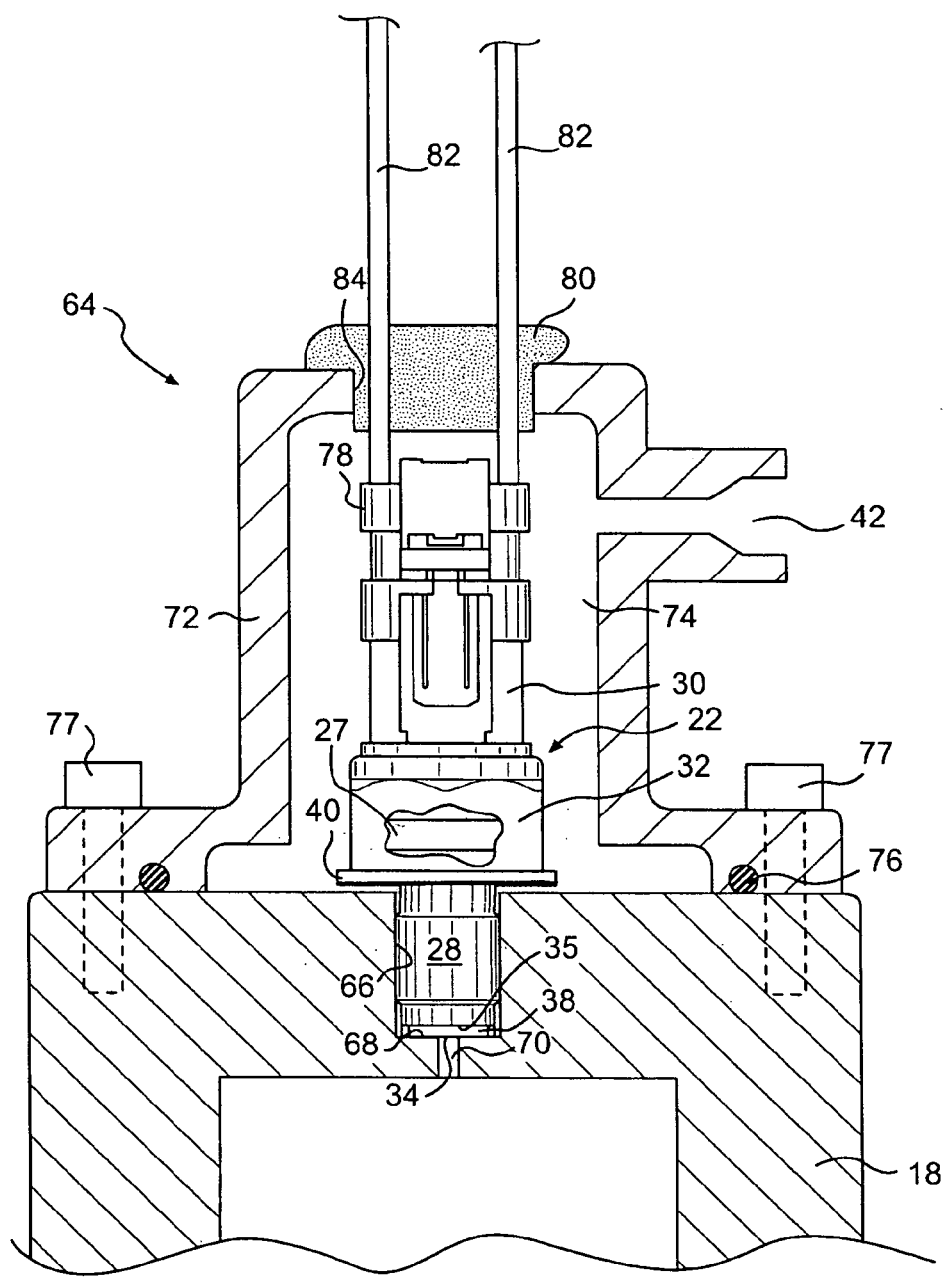
FIG. 4 is a partial cross-sectional illustration of an exemplary disclosed fluid sensor of the fluid system depicted in FIG. 3.

The embodiment of FIG. 3 is similar to the embodiment of FIG. 1, wherein fluid system 10 includes supply tank 12, source 14, fuel injectors 16, and common rail 18. However, instead of a radially disposed sensor 20, fluid system 10 of FIG. 3 may include an axially disposed sensor 64. As illustrated in FIG. 4, sensor 64 may include sensor body 22. However, in contrast to sensor body 22 of FIG. 2, sensor body 22 of FIG. 4 may connect directly to common rail 18, with flange member 40 configured to mate to an end surface of common rail 18. Externally-threaded protrusion 28 may engage internal threads 66 of common rail 18, with sealing washer 38 being disposed between flat end surface 36 of sensor body 22 and a substantially planar end surface 68 of common rail 18. In this manner, central bore 34 of sensor body 22 may fluidly communicate common rail 18 via an axial common rail passageway 70 with sensing element 27. It is contemplated that an air gap may exist between flange member 40 and the end surface of common rail 18 to ensure proper compression and sealing of sealing washer 38.

Sensor 64 may also include an outer wall member 72 that, together with sensor body 22, may form a portion of a low-pressure drain passageway 74. Specifically, outer wall member 72 may completely enclose sensor body 22 and may be sealingly connected to common rail 18, by way of an o-ring 76. Low-pressure drain passageway 74 may include a space provided between outer wall member 72 and sensor body 22 such that fluid that escapes past sealing washer 38 may be allowed to leak to supply tank 12 via low-pressure drain passageway 74 and low-pressure drain passageway 42 of fluid system 10. Outer wall member 72 may be retained by way of threaded fasteners 77.

In the embodiment of FIG. 4, a mating connector 78 configured for connection to electrical connector 30 may also be enclosed within outer wall member 72. In particular, after sensor body 22 has been connected and before assembly of outer wall member 72, mating connector 78 may be connected to electrical connector 30. A compressible sealing member 80 may then be fitted around one or more electrical leads 82 that protrude from mating connector 78 and press-fitted into an orifice 84 of outer wall member 72 such that when outer wall member 72 is assembled, leakage around electrical leads 82 may be minimized.

INDUSTRIAL APPLICABILITY

The disclosed fluid system has wide use in a variety of applications including, for example, fuel systems, lubrication systems, work implement actuation systems, transmission systems, and other hydraulic systems, where fluid leakage to the environment is undesirable. The disclosed fluid system may minimize fluid leakage to the environment by providing a double walled sensor having a leak path between the two walls. This leak path allows fluid that has leaked past an inner of the two walls to drain back to a low-pressure supply tank. The operation of fluid system 10 will now be explained.

During operation of fluid system 10, source 14 may draw fluid from supply tank 12, pressurize the fluid, and direct the pressurized fluid to common rail 18. Sensing element 27 within sensor body 22 may be in fluid communication with the fluid within common rail 18 via either radial passageway 62, first fluid passageway 54, and central bore 34 (referring to FIG. 2) or via axial common rail passageway 70 and central bore 34 (referring to FIG. 4). If fluid leaks past either bite edge 60 (referring to FIG. 2) or sealing washer 38, it may return to supply tank 12 via low-pressure drain passageways 52, 44, and 42 (referring to FIG. 1) or via low-pressure drain passageway 74 (referring to FIG. 2).

It will be apparent to those skilled in the art that various modifications and variations can be made in the fluid system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the invention being indicated by the following claims and their equivalents.

What is claimed is:

1. A sensor for a fluid system having a tank and a source of pressurized fluid, comprising:
   a sensor body enclosing a sensor element that is configured to sense a parameter of the pressurized fluid;
   a first passageway configured to fluidly communicate the sensor element with the pressurized fluid;
   a first sealing interface configured to seal the first passageway;
   a second passageway configured to allow fluid that has leaked past the first sealing interface to drain to the tank;
   at least one electrical lead extending from the sensor; and
   a second sealing interface configured to minimize leakage along the at least one electrical lead,
   wherein the second sealing interface includes a compressible member having at least one opening through which the at least one electrical lead passes.

2. The sensor of claim 1, wherein the pressurized fluid is fuel.

3. The sensor of claim 1, wherein the parameter is a pressure.

4. The sensor of claim 1, wherein the first sealing interface includes a washer compressible during assembly of the sensor with a component of the fluid system.

5. The sensor of claim 1, wherein the first sealing interface includes a bite edge deformable during assembly of the sensor with a component of the fluid system.

6. The sensor of claim 1, wherein the sensor body includes external threads configured to engage internal threads of a component of the fluid system.

7. The sensor of claim 1, further including an outer wall member attachable to a component of the fluid system and configured to enclose the sensor body, the outer wall member and the sensor body forming at least a portion of the second passageway.

8. The sensor of claim 7, further including a sealing interface between the outer wall member and the component of the fluid system.

9. The sensor of claim 1, wherein the sensor body includes a flange configured to engage a surface of a component of the fluid system.

10. The sensor of claim 1, wherein the sensor body includes external threads configured to couple the sensor body with a component of the fluid system.

11. The sensor of claim 10, wherein the sensor body includes a flange configured to be positioned adjacent a surface of the component of the fluid system; and
   wherein the sensor is configured to ensure proper compression and sealing of a sealing washer at the first sealing interface by maintaining an air gap between the flange and the surface of the component of the fluid system.

12. A method of sensing a parameter of a fluid system, the method comprising:
   directing pressurized fluid from the fluid system to a sensor having a sensing element via a first fluid passageway, the sensing element being sealed to a component the fluid system via a first sealing interface;
   sensing a parameter of the pressurized fluid; and
   directing fluid that has leaked past the first sealing interface to a tank via a second fluid passageway,
   wherein the sensor includes a sensor body enclosing the sensing element, a coupling member configured to couple the sensor body to the component of the fluid system, and an intermediate member disposed between the sensor body and the coupling member, the first and second fluid passageways being disposed at least partially within the intermediate member.

13. The method of claim 12, where in the fluid is fuel.

14. The method of claim 12, wherein the parameter is a pressure.

15. The method of claim 12, wherein the first sealing interface includes a washer compressible during assembly of the sensor to the component of the fluid system.

16. The method of claim 12, wherein the first sealing interface includes a bite edge deformable during assembly of the sensor to the component of the fluid system.

17. The method of claim 12, wherein the second passageway is disposed at least partially within the coupling member.

18. The method of claim 12, wherein the second passageway is disposed at least partially between the coupling member and a surface of the component of the fluid system.

19. A fluid system, comprising:
   a tank configured to hold a supply of fluid;
   a source configured to pressurized the fluid;
   a common rail in communication with the source; and
   a sensor including:
      a sensor body enclosing a sensor element that is configured to sense a parameter of the pressurized fluid;
      an intermediate member connected to the sensor body;
      a first passageway configured to fluidly communicate the sensor element with the common rail;
      a first sealing interface configured to seal the first passageway; and
      a second passageway configured to allow fluid that has leaked past the first sealing interface to drain to the tank,
   wherein the first and second fluid passages are disposed at least partially within the intermediate member.

20. The fluid system of claim 19, wherein the pressurized fluid is fuel.

21. The fluid system of claim 19, wherein the parameter is a pressure.

22. The fluid system of claim 19, further including a coupling member configured to couple the sensor body to the common rail.

23. The fluid system of claim 22, wherein the second passageway is disposed at least partially within the coupling member.

24. The fluid system of claim 22, wherein the second passageway is disposed at least partially between the coupling member and an outer surface of the common rail.

25. The fluid system of claim 22, wherein the intermediate member is disposed between the sensor body and the coupling member.

26. The fluid system of claim 25, wherein the first sealing interface includes a bite edge of the intermediate member, the bite edge being deformable to create a seal during assembly to the common rail.

27. The fluid system of claim 26, wherein the intermediate member includes external threads configured to engage internal threads of the coupling member during assembly of the sensor to the common rail, the engaging of the threads of the intermediate member with the threads of the coupling member urging the bite edge against an outer surface of the common rail causing the bite edge to deform.

28. The fluid system of claim 25, wherein the sensor body includes external threads configured to engage internal threads of the intermediate member.

29. A sensor for a fluid system having a tank and a source of pressurized fluid, comprising:
- a sensor body enclosing a sensor element that is configured to sense a parameter of the pressurized fluid;
- a first passageway configured to fluidly communicate the sensor element with the pressurized fluid;
- a first sealing interface configured to seal the first passageway;
- a second fluid passageway configured to allow fluid that has leaked past the first sealing interface to drain to the tank;
- a coupling member configured to couple the sensor body with a component of the fluid system; and
- an intermediate member disposed between the sensor body and the coupling member,
- wherein the first and second fluid passageways are disposed at least partially within the intermediate member.

30. The sensor of claim 29, wherein the second passageway is disposed at least partially within the coupling member.

31. The sensor of claim 29, wherein the second passageway is disposed at least partially between the coupling member and a surface of the component of the fluid system.

32. The sensor of claim 29, wherein the first sealing interface includes a bite edge of the intermediate member, the bite edge being deformable to create a seal during assembly with the component of the fluid system.

33. The sensor of claim 32, wherein the intermediate member includes external threads configured to engage internal threads of the coupling member during assembly of the sensor with the component of the fluid system, the engaging of the threads of the intermediate member with the threads of the coupling member urging the bite edge to deform against a surface of the component of the fluid system.

34. The sensor of claim 29, wherein the sensor body includes external threads configured to engage internal threads of the intermediate member.

35. The sensor of claim 34, further including a second sealing interface between the intermediate member and the sensor body.

36. The sensor of claim 29, further including a second sealing interface between the intermediate member and the coupling member.

* * * * *